(No Model.) 3 Sheets—Sheet 2.
J. D. KELLY, J. WATSON & W. J. BROWN.
DUMPING APPARATUS.
No. 548,995. Patented Oct. 29, 1895.
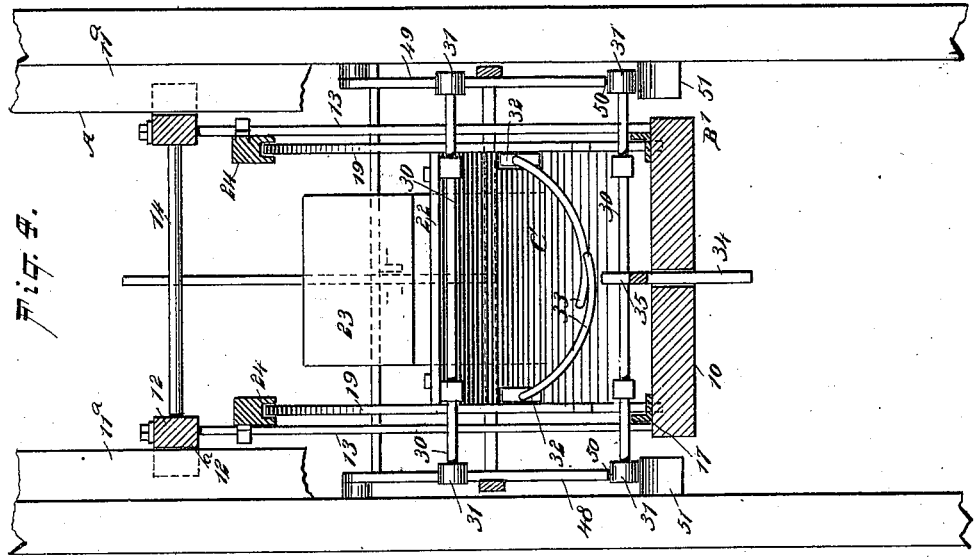
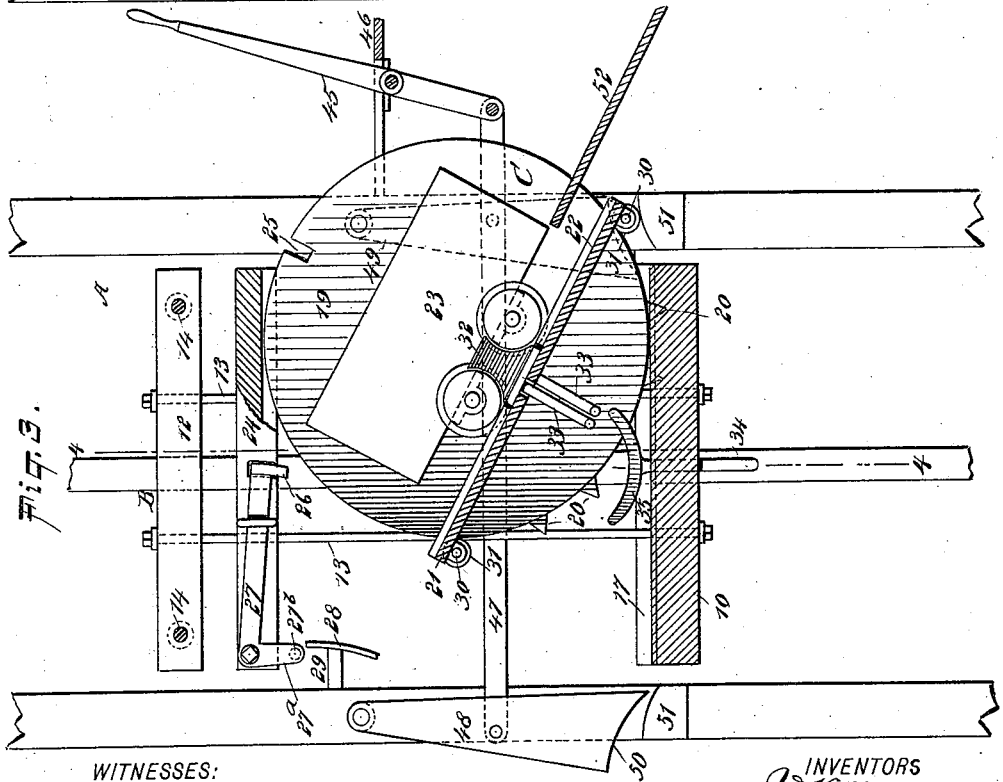
WITNESSES:
William Goebel
J. Fred. Acker
INVENTORS
J. D. Kelly
J. Watson
W. J. Brown
BY Munn & Co.
ATTORNEYS.

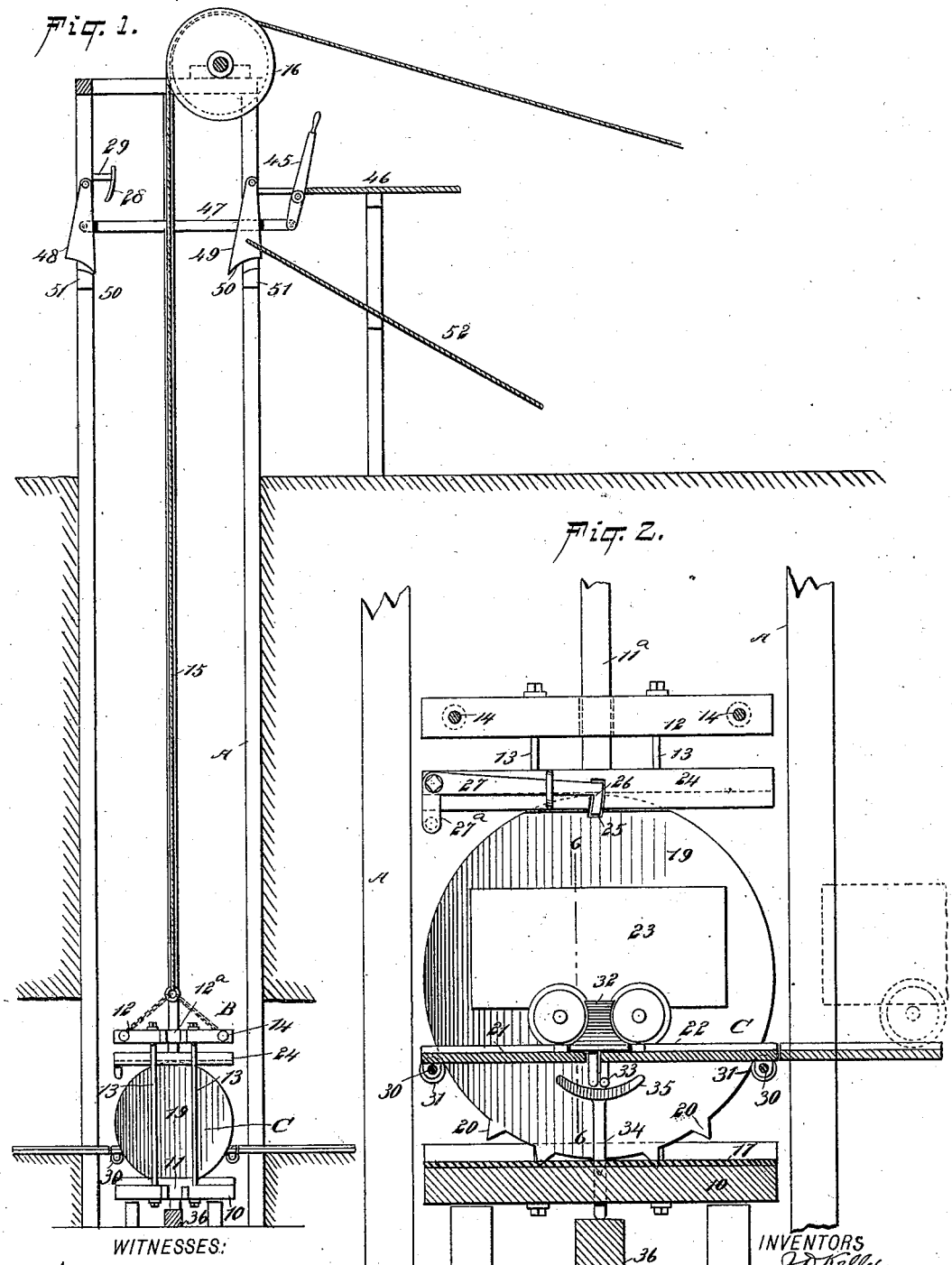

(No Model.) 3 Sheets—Sheet 3.
J. D. KELLY, J. WATSON & W. J. BROWN.
DUMPING APPARATUS.
No. 548,995. Patented Oct. 29, 1895.
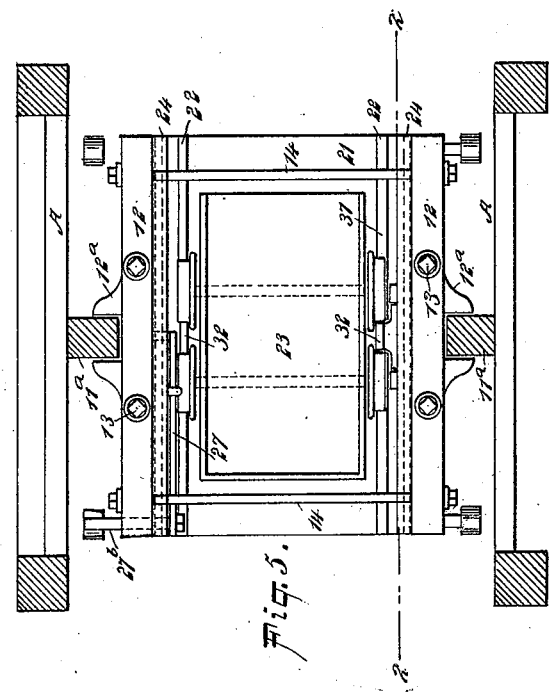
WITNESSES:
William Goebel
J. Fred. Acker
INVENTORS
J. D. Kelly
J. Watson
BY W. J. Brown
Munn & Co
ATTORNEYS.

UNITED STATES PATENT OFFICE.

JOHN D. KELLY, JOHN WATSON, AND WILLIAM J. BROWN, OF COAL CITY, ILLINOIS.

DUMPING APPARATUS.

SPECIFICATION forming part of Letters Patent No. 548,995, dated October 29, 1895.

Application filed April 22, 1895. Serial No. 546,736. (No model.)

*To all whom it may concern:*

Be it known that we, JOHN D. KELLY, JOHN WATSON, and WILLIAM J. BROWN, of Coal City, in the county of Grundy and State of Illinois, have invented a new and Improved Dumping Apparatus, of which the following is a full, clear, and exact description.

Our invention relates to an improved dumping apparatus especially adapted for use in mine-cages and which may be employed with equally good effect in connection with a cage of any description.

The object of this invention is to provide a dumping-platform in connection with a cage upon which a loaded car placed in position in the mine may be locked in place in the cage so that it will not move as the cage is drawn upward or lowered, and, furthermore, to provide a means whereby when the cage has reached a predetermined point in the shaft the platform, with the car still held thereon, may be automatically dumped either to the right or to the left or dumped in either direction by hand without the operator entering the shaft.

A further object of the invention is to construct a dumping apparatus capable of the above-named possibilities and which will be exceedingly simple, durable, and economic in its construction and capable of being operated by any one of ordinary intelligence.

The invention consists in the novel construction and combination of the several parts, as will be hereinafter fully set forth, and pointed out in the claims.

Figure 1 is a vertical section through a shaft, showing the cage in side elevation. Fig. 2 is a transverse section through the cage and the dumping-platform carried thereby on the line 2 2 in Fig. 5, the cage being at the bottom of the shaft. Fig. 3 is a view similar to Fig. 2, illustrating the dumping-platform in dumping position, the cage being at the upper portion of the shaft. Fig. 4 is a vertical section through the cage and the dumping apparatus, taken substantially on the line 4 4 of Fig. 3. Fig. 5 is a horizontal section through the shaft, showing the cage in plan view. Fig. 6 is a section through the dumping apparatus and the car, the said section being taken substantially on the line 6 6 of Fig. 2.

In carrying out the invention the shaft A may be of any approved construction or depth. The cage B may also be of any approved construction, that shown in the drawings, however, comprising a bottom 10, upon which slideways 11 are produced, adapted to receive the guide posts or bars 11ª in the shaft, as shown best in Fig. 5. Side bars 12 are placed in parallel lines at the upper portion of the cage, being attached to the bottom by rods or standards 13 or their equivalents, and slideways 12ª are made in the upper side bars 12 to receive the aforesaid guide-posts 11ª. The construction of the cage is practically completed by connecting the upper side bars 12 by means of cross-rods 14.

A lifting device 15, of any approved character, is applied to the cage, and any approved form of lifting mechanism 16 is used at the upper portion of the shaft.

At each side of the bottom of the cage a track 17 is longitudinally laid, preferably made of angle-iron, and each track is provided with openings 18, arranged at predetermined intervals apart, the openings in the two tracks being in transverse alignment. The cage is adapted to carry a dumping apparatus C, and this apparatus preferably consists of two opposing disks 19, having teeth 20 at their lower peripheral portions adapted to enter the openings 18 in the tracks 17, the disks being located over these tracks and are free to travel thereon. The two disks are connected at or near their centers by a platform 21, and said platform may be provided with tracks 22 to receive the wheels of a car 23, the latter being such as is usually used in mines, although it may be of any desired construction. The upper peripheral surface of each disk is made to enter a horizontal guide 24, secured to the upper side portions of the cage, and one of the disks is provided with a recess 25 in its upper peripheral surface, the said recess being adapted to receive the head 26 of a latch 27, which latch is fulcrumed, preferably, on one of the guides 24 at or near one end thereof and at the pivot-point of the latch-arm 27ª is downwardly projected, being provided with a pin 27ᵇ, as shown in Fig. 5, which extends horizontally in direction of a wall of the shaft. By pivoting the latch near one end the head will constantly gravitate downward and will always be in position to enter the recess 25 in a disk of the dumping-platform. The latch 27 holds the dumping-platform in a horizontal position, and the platform cannot be dumped until the latch is disengaged from the disk 19 of the platform. This is automatically accomplished by placing a curved track 28 near one of the walls of the shaft A, as shown in Fig. 3, the track being provided with a suitable support 29, and this track is so placed that when the cage is carried upward and reaches the point at which the dumping is to occur the pin 27$^b$ of the latch will be in engagement with the outer face of the track 28, thus causing the head of the latch to be elevated, permitting at that time the dumping of the aforesaid platform of the apparatus, and upon the downward movement of the cage the pin 27$^b$ will travel at the opposite side of the track, holding the latch-head in the lower position to which it has gravitated and insuring the head entering the recess 25 of the disk when the dumping platform or apparatus has been restored to its normal position.

At each end of the platform 21 a shaft 30 is secured, extending beyond the sides of the platform, as shown in Fig. 4, and each shaft carries at each end a wheel or roller 31. The car 23 is locked upon the platform 21 after having been placed thereon in the following manner: An opening is made at or about the center of the platform at each side, and a locking-dog 32 is pivoted in each of these openings, as shown in Fig. 6 and as shown in Fig. 2, the said dog being so shaped that it will conform to the space between the wheels of the car at the sides thereof and will virtually contact at each side with the periphery of the wheels, thus effectually holding the car stationary. These dogs are so weighted that they naturally gravitate inward to a locking position with the wheels; but each dog is provided with an arm 33, carried downward beneath the platform 21 of the dumping apparatus, as is likewise shown in Fig. 6, and said arms usually pass one another at their free ends. The car is not released from the locking-dogs until the cage reaches the bottom of the mine, when it is necessary that the car shall be free to be removed from the cage and a loaded car substituted. This release is accomplished by placing a bolt or bar 34 loosely in the bottom of the cage, the said bolt or bar extending through the bottom, and it is provided at its inner or outer end with a clutch-head 35, immediately below the overlapping portions of the arms 33 of the dogs. Consequently when the cage reaches the bottom of the shaft the bolt or bar 34 will be brought in engagement with a block 36 or its equivalent and the clutch-head will be forced upward, carrying the arms of the dogs likewise to an upper position, as shown in dotted lines in Fig. 6, and consequently the locking-dogs will be carried outward, releasing the wheels of the car. The teeth on the disks of the dumping apparatus prevent the same from leaving the cage and, furthermore, guide the dumping apparatus in its dumping movement. The disks are free to roll toward either side of the cage. Consequently a dumping of the car may be effected at either side of the shaft.

The means for automatically dumping the platform are illustrated in Figs. 1, 3, and 4, in which it will be observed that a hand-lever 45 is fulcrumed at or near the platform 46, upon which the operator stands. This hand-lever at its lower end is pivotally connected with a shifting-bar 47, and the said shifting-bar is pivotally connected with two stops 48 and 49, which are pivoted at their upper ends upon a side wall of the shaft. The lower ends of these stops are wider than their upper ends and are provided with concaved faces 50, the said concaved faces having an inclination from the outside edges of the stops downward in direction of the interior of the shaft, and a rest 51, in the form of a block, for example, is located beneath each of said stops, the upper faces of the rests being reversely curved to the opposing surfaces of the stops, and the connection between the stops and the shifting-bar 47 is such that when the lower edge of one stop is carried within the shaft and in the path of the ascending cage the opposing stop will be carried outside of the shaft and will not come in contact with the cage.

If the dumping is to be effected at the right-hand side of the shaft, as shown in Figs. 1 and 3, the right-hand stop is thrown inward, and when the cage reaches the top of the shaft and at the time that the latch 27 is released from the dumping apparatus the rollers 31 at the right-hand end of the dumping apparatus will be caught by the concaved face of the right-hand stop, and as the cage continues upward these rollers will travel between the right-hand stop and the rest below it, as shown in Fig. 3, causing the dumping apparatus to incline to the right and spill the contents of the car upon the chute 52 at that side, it being understood that the stops 48 and 49 are duplicated at each side of the shaft, so that both rollers at one end of the car will be in engagement with a stop.

It is evident that when the stop devices have once been set the dumping will be thoroughly automatic and that in a moment the stops may be so shifted as to dump the load at the opposite side of the shaft.

It is evident that this device is exceedingly simple and economic, and that it is applicable to any shaft and will greatly facilitate the operation of hoisting cars, dumping the same, and loading the cage, it being utterly impossible for the car to slip from the cage or move in any manner while the cage is in transit or during the operation of dumping.

Having thus described our invention, we claim as new and desire to secure by Letters Patent—

1. The combination with an elevator shaft and a cage movable therein, of two disks mounted to roll on the cage, a platform on said disks, a wheel at each end of the platform, two beams in the elevator shaft and having curved upper faces and located each side of the car, two trip levers respectively mounted above the beams and having curved faces directly above the curved faces of the beams, and means for alternately operating said trip levers, substantially as described.

2. The combination of an elevator cage, two disks capable of rolling in the cage, a platform carried by the disks, and means for rolling the disks, substantially as described.

3. The combination of an elevator cage, two disks within the cage and capable of rolling therein, a platform carried by the disks, and a trip plate located off the cage and adapted to engage with the platform, substantially as described.

4. The combination of an elevator cage, two disks capable of rolling therein, a platform carried by the disks, and a locking dog pivotally mounted on the platform, substantially as described.

5. The combination of an elevator cage, two disks capable of rolling therein, a platform carried by the disks, two dogs pivotally mounted on the platform, arms respectively secured to the dogs and projecting downwardly below the platform, and means for operating the arms, substantially as described.

6. The combination of an elevator cage, two disks capable of rolling therein, a platform carried by the disks, a lever capable of locking with one disk, and a trip off the cage and adapted to engage the lever, substantially as described.

7. The combination of an elevator cage, two disks capable of rolling therein, a platform carried by the disks, a wheel on the platform, a beam off the cage and having an inclined upper side, and a trip plate having a curved portion conforming to the upper side of the beam and between which parts the wheel of the platform is adapted to move, substantially as described.

8. The combination with an elevator shaft, of a cage movable therein, two disks having spiked peripheries mounted to roll in the cage, a platform extending between the disks and connected thereto, two dogs pivotally mounted on the platform, an arm connected to each dog, and a bolt or bar movable vertically in the cage and capable of engaging with the arms, substantially as described.

9. The combination with an elevator shaft, of a cage movable therein, two disks mounted to roll in the cage, a platform extending from one disk to the other and connected to each, a wheel at each end of the platform, two beams, one at each side of the upper end of the shaft and having beveled or inclined upper faces, two trip plates pivotally mounted above the respective beams and having curved edges conforming to the grooves or bevels of the beams, and means for operating the trip plates in unison, substantially as described.

JOHN D. KELLY.
JOHN WATSON.
WILLIAM J. BROWN.

Witnesses:
JAMES YATES,
JOHN BOOL.